United States Patent [19]

Kakimi et al.

[11] 4,219,604

[45] Aug. 26, 1980

[54] METHOD OF FORMING MICROCAPSULES, MICROCAPSULAR DISPERSION, AND PRESSURE SENSITIVE RECORDING SHEET

[75] Inventors: Fujio Kakimi; Yoshiyuki Hoshi; Keiso Saeki, all of Fujinomiya, Japan

[73] Assignee: Fuji Photo Film Co., Ltd., Minami-ashigara, Japan

[21] Appl. No.: 970,593

[22] Filed: Dec. 18, 1978

[30] Foreign Application Priority Data

Dec. 20, 1977 [JP] Japan ................. 52-153430

[51] Int. Cl.² .......................... B01J 13/02; B32B 3/26
[52] U.S. Cl. .................................... 428/307; 252/316; 282/27.5; 424/32; 428/327; 428/914
[58] Field of Search ................. 252/316; 428/307, 914

[56] References Cited

U.S. PATENT DOCUMENTS

| 3,707,514 | 12/1972 | Vassiliades et al. | 521/65 |
|---|---|---|---|
| 3,789,015 | 1/1974 | Matsukawa et al. | 252/316 |
| 4,001,140 | 1/1977 | Foris et al. | 252/316 |
| 4,089,802 | 5/1978 | Foris et al. | 252/316 |

Primary Examiner—Richard D. Lovering
Attorney, Agent, or Firm—Sughrue, Rothwell, Mion, Zinn and Macpeak

[57] ABSTRACT

A method of forming microcapsules having high heat resistance and low permeability which comprises the step of forming wall films of urea-formaldehyde resin around individual droplets of a hydrophobic oily solution through the polymerization reaction of urea and formaldehyde in the presence of carboxylated polyvinyl alcohol.

8 Claims, No Drawings

METHOD OF FORMING MICROCAPSULES, MICROCAPSULAR DISPERSION, AND PRESSURE SENSITIVE RECORDING SHEET

BACKGROUND OF THE INVENTION

1. Field of the Invention

The present invention relates to a method of forming microcapsules containing hydrophobic oil droplets therein and having wall films of urea-formaldehyde resin therearound. More specifically, the present invention relates to a method of forming microcapsules for the purpose of improving the function of the microcapsules wherein carboxylated polyvinyl alcohol is present during the polymerization reaction of urea and formaldehyde whereby the urea-formaldehyde capsule walls are produced around individual droplets of the hydrophobic oily solution dispersed in an aqueous phase.

2. Description of the Prior Art

Heretofore, various macromolecular electrolytes have been tried during the formation of microcapsule walls by polymerizing urea and formaldehyde around a previously dispersed hydrophobic oily solution. These electrolytes function to prevent coagulation of the microcapsules as well as as a binder and an emulsifying oil. For instance, ethylene-maleic anhydride copolymer, methyl vinyl ether-maleic anhydride copolymer and polyacrylic acid have been employed as macromolecular electrolytes, as disclosed in U.S. Pat. No. 4,001,140. However, microcapsule wall films produced utilizing these macromolecular electrolytes do not have sufficient heat resistance and mechanical strength, and/or exhibit high permeability. Consequently, the use of oil-containing microcapsules produced using the above-described macromolecular electrolytes in pressure sensitive copying sheets has been accompanied by the defects described below;

(a) Deterioration in the permeability of the microcapsule wall film caused by heat resulting in a decrease in the coloring ability of the pressure sensitive copying sheets when allowed to stand in high temperature atmosphere.

(b) When a plurality of pressure sensitive copying sheets are wetted with water in a stacked condition, intense coloration of the color developer sheets or the capsule sheets occurs due to the high permeability of the microcapsule wall films.

SUMMARY OF THE INVENTION

Therefore, the object of the present invention is to overcome the above-described defects. Specifically stated, it is the object of the present invention is to provide a method of forming microcapsules of high heat resistance and reduced permeability.

The above-described objects are attained by forming urea-formaldehyde resin wall around previously dispersed droplets of a hydrophobic oily solution through the polymerization reaction of urea and formaldehyde in the presence of carboxylated polyinyl alcohol.

DETAILED DESCRIPTION OF THE INVENTION

The carboxylated polyvinyl alcohols which may be employed in the present invention have a weight average molecular weight of about 1,000 to about 300,000, preferably 10,000 to 150,000, more preferably 10,000 to 100,000; a saponification degree of 50% to 98% and a carboxy group content of about 1 to about 40 mole %.

Carboxylated polyvinyl alcohols can be prepared by various methods. For example, (1) by copolymerizing a carboxy group-containing vinyl or vinylidene monomer (e.g., those monomers described in Canadian Patent No. 929,430, e.g., acrylic acid, methacrylic acid, fumaric acid, itaconic acid, maleic acid, crotonic acid, etc.) with a vinyl ester (e.g., esters of vinyl alcohols and carboxylic acids containing one to five carbon atoms, such as a vinyl acetate ester, etc.) and hydrolyzing the resulting copolymers, or (2) by reacting polyvinyl alcohol with polybasic acid derivatives (e.g., acid anhydrides, acid halides and the like) whereby carboxy groups are introduced into the side chains of the polyvinyl alcohol. For example carboxylated polyvinyl alcohols can be prepared as described in Japanese Patent Publication No. 38753/1976.

Carboxylated polyvinyl alcohols prepared using either method described above can be employed in the present invention. Specific examples of carboxylated polyvinyl alcohols include, for example, a partially esterified product prepared by the reaction of polyvinyl alcohol with malonic acid, maleic acid, terephthalic acid or an anhydride or acid chloride thereof.

The microencapsulation process of the present invention is illustrated in detail below.

The process of the present invention comprises basically the following steps of:

(1) preparing an aqueous solution of a carboxylated polyvinyl alcohol and urea;
(2) emulsifying and dispersing a hydrophobic oily solution substantially insoluble in the aqueous solution prepared in step (1) which becomes the core material in the aqueous solution (1);
(3) admixing formaldehyde; and
(4) allowing urea and formaldehyde to copolymerize in the resulting aqueous system with stirring.

In the process, urea may be added to the microencapsulation system in step (1) after step (2) and before step (4). The urea and formaldehyde can be added at the same time.

The presence of ammonium salts of acids at the time of the polymerization reaction can accelerate the polymerization reaction. The acid making up the acidic ammonium salt may be inorganic acid or organic acid having a pKa$\leq$5, preferably pKa$\leq$2, most preferably pKa$\leq$ −1. Examples of an inorganic acid include hydrogen selenide, hydrogen fluoride, nitrous acid, chlorous acid, phosphoric acid, arsenic acid, phosphorous acid, sulfurous acid, periodic acid, hypophosphorous acid, pyrophosphoric acid, iodic acid, chloric acid, chromic acid, nitric acid, permanganic acid, selenic acid, sulfonic acid, hydrochloric acid, perchloric acid, hydrogen bromide, hydrogen iodide, etc. Examples of organic acid include formic acid, acetic acid, propionic acid, trifluoroacetic acid, trichloroacetic acid, acrylic acid, benzoic acid, naphthoic acid, benzenesulfonic acid, naphthalenesulfonic acid, p-toluenesulfonic acid, oxalic acid, malonic acid, succinic acid, glutaric acid, adipic acid, oxaloacetic acid, maleic acid, fumaric acid, tartaric acid, phthalic acid, citric acid, etc. Preferred examples of the ammonium salts include ammonium chloride, ammonium sulfate, ammonium nitrate and ammonium dihydrogenphosphate. These salts are usually added after step (2).

The carboxylated polyvinyl alcohols are effective when used in an amount of about 0.1 to 20 wt %. Moreover, in the encapsulation system of the present invention the carboxylated polyvinyl alcohols are preferably used in a concentration ranging from about 0.5 to 10 wt % and most preferably in an amount of 1 to 5 wt % based on the polymerization system. The hydrophobic oil is generally present in the polymerization system in an amount of 5 to 50 wt % and preferably 20 to 40 wt %. The concentration of the urea used is about 1 to 50 wt % and preferably about 5 to 40 wt % based on the oil and the formaldehyde is used in an amount of 0.6 to 5.0 mol %, preferably 1.0 to 4.0 mol % and most preferably 1.4 to 3.0 mol % based on the urea.

In order to force the polymerization reaction of urea and formaldehyde to proceed, the pH value of the entire system must be adjusted to 7.0 or less, preferably 5.0 or less, more preferably 4.5 or less and most preferably, 4.0 or less. The lower the pH the better. In addition, the temperature of the reaction system must be brought to 10°–95° C., preferably 25°–85° C., more preferably 35°–75° C. and most preferably, 45°–60° C.

As suitable core materials for forming the individual microcapsules, mention may be made of natural mineral oils, animal oils, vegetable oils, synthetic oils and the like. Examples of the mineral oils include petroleum and petroleum fractions such as kerosene, gasoline, naphtha and paraffin oil. Examples of the animal oils include fish oils, lard oil and the like. Examples of the vegetable oils include peanut oil, linseed oil, soybean oil, castor oil, corn oil and the like. Examples of the synthetic oils include biphenyls (e.g., isopropyl biphenyl, isoamyl biphenyl, etc.), terphenyl compounds (e.g., those which are described in German Patent Application OLS No. 2,153,635), phosphoric acid compounds (e.g., triphenyl phosphate), naphthalene compounds (e.g., diisopropylnaphthalene described in German Patent Application OLS No. 2,141,194 and U.S. Pat. No. 4,003,589), methane compounds (e.g., 2,4-dimethyldiphenyl methane which are described in German Patent Application OLS No. 2,153,634 and U.S. Pat. No. 3,836,383), phthalic acid compound (e.g., diethyl phthalate, dibutyl phthalate, dioctyl phthalate, etc.), salicylic compounds (e.g., ethyl salicylate) and the like. These oils are usually employed in an amount of about 5 to 50 wt %, preferably about 20 to 40 wt %.

To these natural mineral oils, animal oils, vegetable oils and synthetic oils; agricultural chemicals, medicines, perfumes, chemicals, adhesives, liquid crystals, foods, cleaning materials, the dyestuff precursors, color developers, catalysts, rust inhibitors and the like can be suitably admixed depending upon the use.

At the time of the polymerization of the urea and formaldehyde in accordance with the present invention, 5 to 30 wt % based on the amount of urea of polyhydric phenols may (optionally) be added to reaction system to prevent coagulation of the capsules (e.g., in Step (1) or after Step (2) or in Step (3)). Polyhydric phenols are disclosed in U.S. Pat. No. 4,001,140. Examples of the polyhydric phenols include resorcinol, catechol, pyrogallol, phloroglucin, gallic acid, hydroquinone, orcine, tannic acid and the like.

The term urea-formaldehyde resins as used in the present invention is used in a little wider sense and is not strictly limited to resins consisting of urea and formaldehyde but includes amino resins. Amino resins, in general, are those prepared from compounds having at least two amino groups in one molecule, urea, and aldehydes by polymerization reaction. Examples of such amines include guanidine, N-methyl urea, thiourea and melamine. In this specification the term urea-formaldehyde resins also includes these amino modified urea formaldehyde resins. Generally the amine may be added when preparing the carboxylated polyvinyl alcohol and urea solution during the process or after emulsifying and dispersing the oily solution. As another alternative the amine can be added when admixing formaldehyde. The amount of the amine may be 0 to 1 mol per mol of urea. U.S. Pat. No. 4,001,140 discloses the use of amino resins in forming microcapsules.

The present invention is very useful for the production of microcapsules, particularly those which are applied to pressure sensitive copying sheets. In accordance with the present invention, carboxylated polyvinyl alcohols are present as an anionic macromolecular electrolyte at the time of forming the urea-formaldehyde resin wall films, which can lead to the production of microcapsules having high heat resistance and low permeability.

The size of microcapsules can be adjusted for the end use. In case of pressure sensitive copying sheets, the size of microcapsules ranges preferably from 1 to 20 microns, more preferably from 1.5 to 10 microns and most preferably, from 2 to 8 microns.

The present invention will be illustrated in greater detail by the following Example and Comparison Examples. However, this example should not be construed as limiting the scope of the present invention. All parts, percents, ratios, etc. are by weight unless otherwise indicated.

EXAMPLE

Carboxylated polyvinyl alcohol (molecular weight: about 100,000, saponification degree: 90%, and carboxy content: 5 mole %) was dissolved in hot water to prepare a 10% aqueous solution. 2.5 parts of urea and 0.25 part of resorcinol were added to 25 parts of the aqueous solution, and dissolved therein with stirring. The pH of the resulting system was adjusted to 3.7 using 1 normal (1 N) hydrochloric acid.

To the aqueous solution obtained above, 25 parts of diisopropylnaphthalene in which 2.5% crystal violet lactone and 1.0% benzoyl leuco methylene blue were dissolved was added with vigorous stirring and emulsified to produce an oil/water emulsion. Stirring was stopped when the oil droplet size became on the average 5 microns.

To this emulsion, 30 parts of a 1.0% ammonium chloride aqueous solution was added. Thereto, 6.4 parts of a 37% formaldehyde aqueous solution was added dropwise while stirring was continued, and the temperature of the system was adjusted to 60° C. The stirring was continued for one hour and the temperature of the system was maintained at that temperature. The system was then cooled to 25° C. to yield a color forming oil-containing capsule slurry.

The capsules obtained in this example are useful for preparing pressure sensitive copying sheets.

COMPARISON EXAMPLE 1

A capsule slurry was produced in the same manner as in the Example except that 25 parts of a 10% aqueous solution of ethylene-maleic anhydride copolymer (EMA-21; trade name, produced by Monsanto Chemical Co.) was used instead of 25 parts of a 10% aqueous solution of carboxylated polyvinyl alcohol, and the pH was adjusted using a 20% aqueous solution of sodium hydroxide instead of hydrochloric acid.

COMPARISON EXAMPLE 2

A capsule slurry was prepared in the same manner as in the Example except that 25 parts of a 10% aqueous solution of vinyl methyl ether-maleic anhydride copolymer (GANTREZ AN-139, trade name, produced by General Aniline & Film; molecular weight of about 25,000) was used instead of 25 parts of a 10% aqueous solution of carboxylated polyvinyl alcohol, and the pH adjustment was carried out using a 20% aqueous solution of sodium hydroxide instead of hydrochloric acid.

COMPARISON EXAMPLE 3

An encapsulation was attempted in the same manner as in the Example except that 25 parts of a 10% aqueous solution of polyacrylic acid (G-36-10, trade name, produced by ARAKAWA Kagaku K.K.) was used instead of 25 parts of a 10% aqueous solution of carboxylated polyvinyl alcohol, and the pH adjustment was carried out using a 20% aqueous solution of sodium hydroxide instead of hydrochloric acid, however, aggregation occurred among the capsules produced and solidification took place.

COMPARISON EXAMPLE 4

All operations of encapsulating procedure were performed in the same manner as in the Example except that 25 parts of a 10% aqueous solution of polyvinyl alcohol (Poval-205, trade name, produced by Kuraray Co.) was used instead of 25 parts of a 10% aqueous solution of carboxylated polyvinyl alcohol, but no capsule wall films could be produced.

50 Parts water was added to 50 part portions of each of the capsule slurries obtained in the Example, Comparison Example 1 and Comparison Example 2, and the pH of the resulting mixture was adjusted to 10. The mixture was applied to a sheet of paper having a weight of 50 g/m$^2$ in an dry amount of 4.2 g/m$^2$ with coating rod, and dried to produce a capsule coated sheet (hereafter, sheet A).

The developer sheet (hereafter, sheet C) used in combination with the sheet A for evaluating heat resistance and permeability (coloring after dipping in water) of the wall films obtained was prepared as follows.

60 Parts of kaoline and 2 parts of sodium alkylbenzenesulfonate were dispersed or dissolved in 300 parts of water and the resulting dispersion was adjusted to pH 10 using a 10% aqueous solution of sodium hydroxide. With careful stirring, 70 parts of a 10% aqueous solution of zinc chloride was added to the dispersion. Then, as the stirring continued, a solution prepared by dissolving 0.1 gram equivalent of 3,5-di-tert-butyl salicylic acid in 200 parts of a 2% aqueous solution of sodium hydroxide was injected into the resulting dispersion to bring about the reaction. To the thus obtained dispersion, 50 parts of carboxylated styrenebutadiene copolymer latex (with solids content of 40%) was added to prepare a coating solution. This coating solution was applied to a sheet of paper having a weight of 50 g/m$^2$ using a coating rod so as to provide a solid content of 3.0 g/m$^2$, and dried to prepare sheet C.

The characteristics of capsules were examined as follows:

Heat Resistance

After putting sheet A on the sheet C such that the capsule-coated surface of sheet A faced the developer-coated surface of sheet C and pressing under a pressure of 600 Kg/cm$^2$, the color density on the surface of sheet C was measured. On the other hand, using a sheet A which had been allowed to stand for 10 hours in an oven heated to 100° C. the same examination was carried out. Heat resistance was evaluated based on the change in color density caused by the above-described heating treatment. Namely, heat resistance is represented by the ratio of the color density attained with sheet A allowed to stand for 10 hours at 100° C. to the color density obtained with sheet A not receiving any heating treatment, which ratio is multiplied by 100 upon comparison.

The color density measurements were carried out using a reflection type spectrophotometer (Beckman DB Spectrophotometer, wave length of measurement: 610 m$\mu$).

Coloration By Dipping In Water

The capsule coated surface of sheet A and the developer coated surface of sheet C were placed face to face, and dipped in water for 5 seconds. After drying, the color density on the surface of the sheet A was measured using the spectrophotometer described above.

The above-described characteristics of the capsule walls in the Example, Comparison Example 1 and Comparison Example 2 each are shown in Table 1 for the purpose of comparison.

Table 1

| | Characteristics of Capsule Films | | Coloration Upon Dipping in Water** (permeability) |
|---|---|---|---|
| | Aggregation | Heat Resistance* | |
| Example | None | 100 | A |
| Comparison 1 | None | 90 | C |
| Comparison 2 | None | 90 | B |

*100: no problems in practical use.
90 or lower: drop in coloring ability with the passage of time.
**A: ideal for practical use.
B: somewhat high coloration density-of questionable practical use.
C: considerable high coloration density-unsuitable for practical use.

It can be seen from the results in the table that only the capsule in the Example has heat resistance suitable for practical use, and with respect to coloration by dipping in water, the Example capsules exhibit the best anticoloration effect.

As described above, it becomes apparent that the presence of carboxylated polyvinyl alcohol upon forming the urea-formaldehyde resin wall can provide a capsule wall with excellent characteristics (particularly, low permeability upon dipping in water). This result is unexpected and surprising in view of the fact that polyvinyl alcohol not containing any carboxy groups hinders or can not contribute to the formation of wall films as shown in the Comparison Example 4.

While the invention has been described in detail and with reference to specific embodiments thereof, it will be apparent to one skilled in the art that various changes and modifications can be made therein without departing from the spirit and scope thereof.

What is claimed is:

1. A method of forming microcapsules which comprises polymerizing a urea and formaldehyde resin capsule wall around individual droplets of a hydrophobic oily solution in the presence of carboxylated polyvinyl alcohol, wherein said carboxylated polyvinyl alcohol has a molecular weight of 1,000 to about 300,000, a saponification degree of 50% or more, a carboxy group content of 1 to about 40 mol %, and is present in the polymerization system in an amount of 0.5 to 10% by weight based on the weight of the system.

2. The method of claim 1, wherein an ammonium acid salt is additionally present during said polymerization.

3. The method of claim 1, wherein a polyhydric phenol is additionally present during said polymerization.

4. The method of claim 1, which comprises polymerizing a resin capsule of urea, aldehyde and a compound having at least two amino groups in the molecule around droplets of a hydrophobic oily solution.

5. The method of claim 4, wherein said compound having at least two amino groups is guanidine, N-methyl urea, thiourea or melamine.

6. A method of forming microcapsules which comprises: forming an aqueous solution of a carboxylated polyvinyl alcohol, wherein said carboxylated polyvinyl alcohol has a molecular weight of 1,000 to about 300,000, a saponification degree of 50% or more, a carboxy group content of 1 to about 40 mol %, and is present in the polymerization system in an amount of 0.5 to 10% by weight based on the weight of the system, emulsifying and dispersing a hydrophobic oily solution in said alcohol solution to form droplets of the hydrophobic oily solution, adding urea and formaldehyde to the system and copolymerizing the urea and formaldehyde to form a resin wall around the hydrophobic oil droplets.

7. A pressure sensitive recording sheet comprising a support having coated thereon a layer of microcapsules prepared by polymerizing a urea and formaldehyde resin around individual droplets of a hydrophobic oily solution in the presence of carboxylated polyvinyl alcohol wherein said carboxylated polyvinyl alcohol has a molecular weight of 1,000 to about 300,000, a saponification degree of 50% or more, a carboxy group content of 1 to about 40 mol%, and is present in the polymerization system in an amount of 0.5 to 10% by weight based on the weight of the system.

8. A microcapsule dispersion prepared by polymerizing a urea and formaldehyde resin wall around individual droplets of a hydrophobic oily solution in the presence of carboxylated polyvinyl alcohol, wherein said carboxylated polyvinyl alcohol has a molecular weight of 1,000 to about 300,000, a saponification degree of 50% or more, a carboxy group content of 1 to about 40 mol%, and is present in the polymerization system in an amount of 0.5 to 10% by weight based on the weight of the system.

* * * * *